United States Patent [19]

Raymor

[11] Patent Number: 4,961,559

[45] Date of Patent: Oct. 9, 1990

[54] LATCHING BAR ARRANGEMENT FOR SEAT ADJUSTER

[75] Inventor: Robert B. Raymor, Walled Lake, Mich.

[73] Assignee: Chrysler Corporation, Highland Park, Mich.

[21] Appl. No.: 451,835

[22] Filed: Dec. 18, 1989

[51] Int. Cl.$^5$ ............................................. F16M 13/00
[52] U.S. Cl. ................................................... 248/429
[58] Field of Search ............... 248/419, 420, 429, 430, 248/424, 425; 297/344, 341

[56] References Cited

U.S. PATENT DOCUMENTS

| | | | |
|---|---|---|---|
| 3,866,876 | 2/1975 | Adams | 248/429 |
| 4,378,101 | 3/1983 | Kazaoka | 248/430 |
| 4,635,890 | 1/1987 | Matsuda | 248/429 |
| 4,639,038 | 1/1987 | Heling | 297/341 |
| 4,730,804 | 3/1988 | Higuchi | 248/429 |
| 4,781,354 | 11/1988 | Nihei | 248/430 |
| 4,852,846 | 8/1989 | Weier | 297/341 |
| 4,898,356 | 2/1990 | Pipon | 297/344 |

FOREIGN PATENT DOCUMENTS

| | | | |
|---|---|---|---|
| 937 | 11/1973 | Canada | 248/430 |
| 2806795 | 8/1979 | Fed. Rep. of Germany | 248/420 |
| 3742653 | 7/1988 | Fed. Rep. of Germany | 297/341 |
| 1546166 | 5/1979 | United Kingdom | 248/429 |
| 2013771 | 8/1979 | United Kingdom | 248/430 |

Primary Examiner—Ramon O. Ramirez
Assistant Examiner—Robert A. Olson
Attorney, Agent, or Firm—Edward P. Barthel

[57] ABSTRACT

A dual latching arrangement for a pair of laterally spaced slide track assemblies supporting a vehicle seat support structure for horizontal fore and aft movement to a plurality of adjusted positions. The dual latching arrangement consists of a central U-shaped lift bar having each of its longitudinal legs rotationally supported about a transverse pivot axis adjacent the aft end of an associated track. Primary and secondary latching mechanisms are supported on respective upper sliding track members adjacent an associated leg for rotation about the pivot axis. Primary and secondary biasing springs are operative to urge each primary and secondary locking detent toward engagement with a series of openings on an associated lower track member fixed to the vehicle. Upon the lift bar being rotated to its unlatched mode the primary and secondary detents are removed from their lock openings allowing the seat support structure to be longitudinally adjusted. The dual latching arrangement accommodates for any tolerances variations between the track assemblies by requiring the primary latch mechanism to rotate in unison with latch bar locking the primary detent in an associated lower track opening thereby locking the seat support structure in an adjusted position while permitting the secondary latch mechanism detent to be biased towards its latching mode independent of the latch bar movement. The secondary biasing spring thus urges the secondary detent into floating contact with its lower track member for automatic engagement of the secondary detent in a corresponding lock opening upon subsequent tolerance compensating travel of the secondary upper track member.

2 Claims, 2 Drawing Sheets

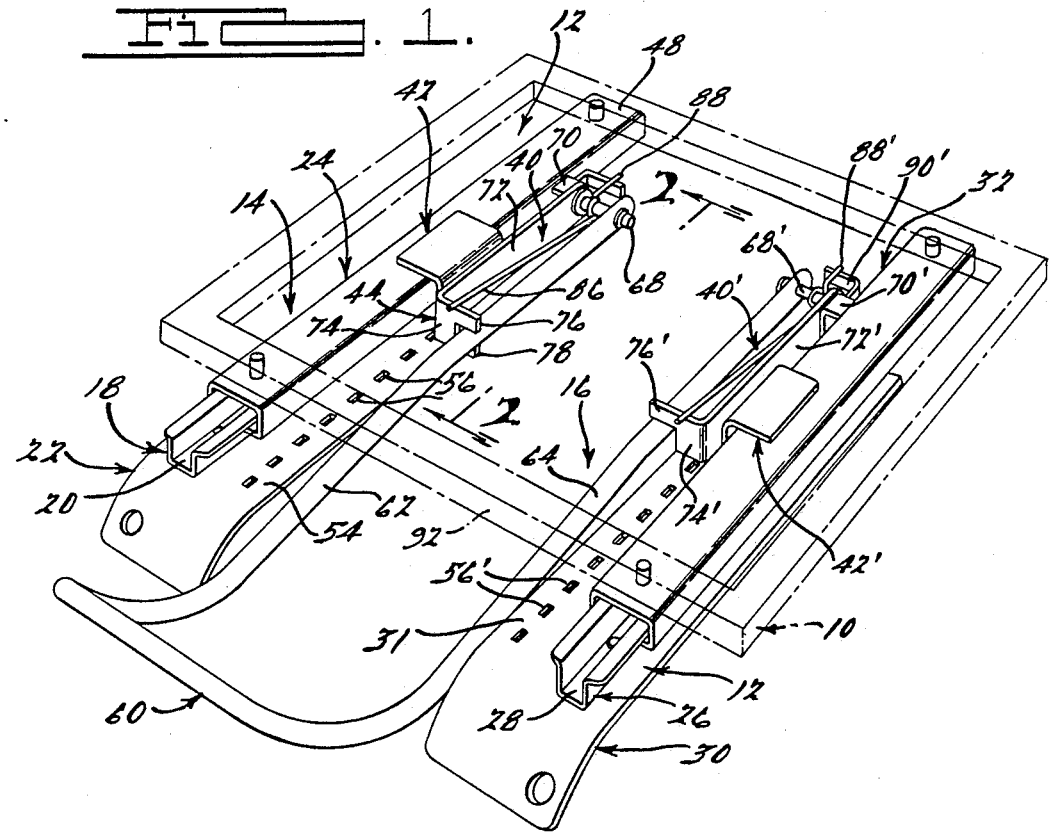
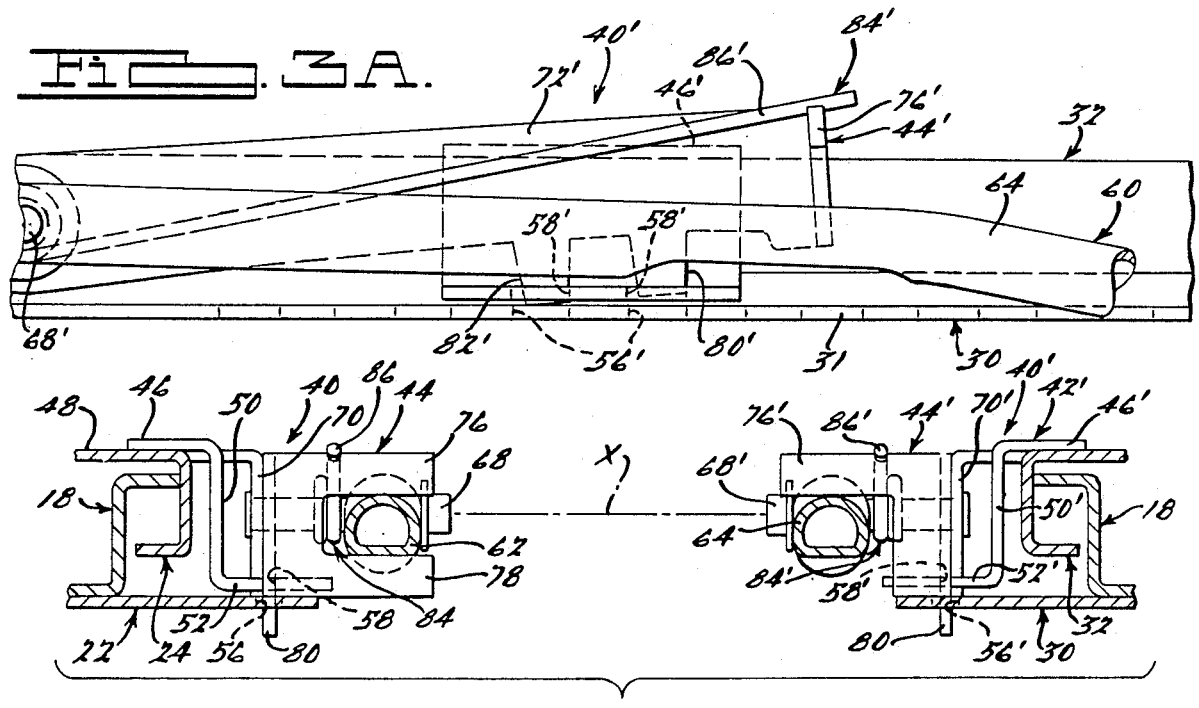

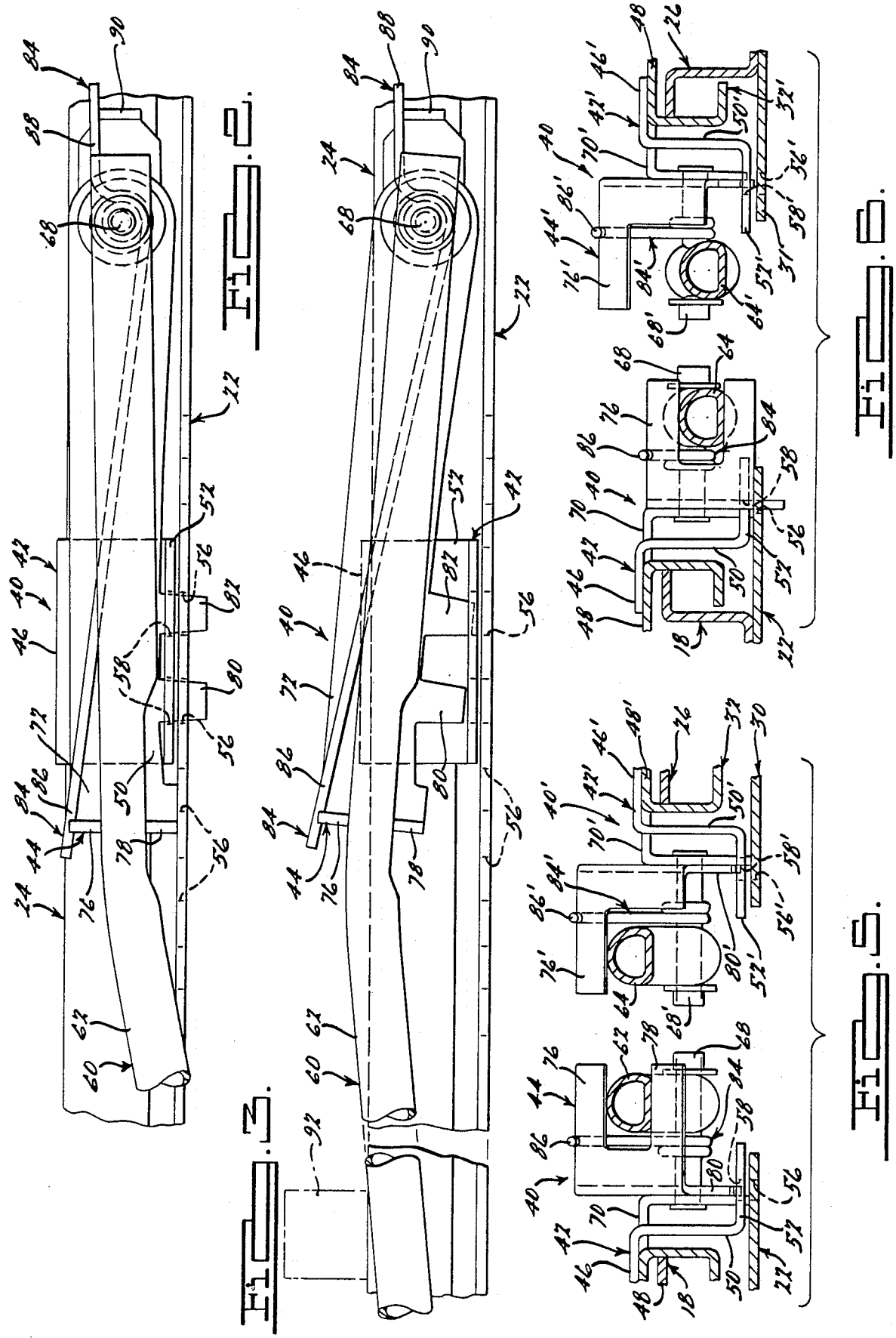

LATCHING BAR ARRANGEMENT FOR SEAT ADJUSTER

INTRODUCTION

This invention relates to a seat for automobiles and more particularly to an improved latching arrangement for the longitudinal adjustment of the seat.

BACKGROUND OF THE INVENTION

The prior art is replete with dual looking arrangements operative for locking a pair of sliding track assemblies for longitudinal adjustment of an automotive seat. The U.S. Pat. No. 4,635,890 issued Jan. 13, 1987 to Matsuda, et al. is an example of one form of dual latching arrangement for a seat slide structure.

Such dual latching systems have experienced problems such as misalignment of a locking detent with its corresponding lock opening causing the latch mechanisms to be out of synchronization. Therefore, during adjustment, if the detents from both latches are not aligned with their respective openings, a possibility exists that the detent of one track assembly will not fully engage when the operating bar is released.

BRIEF DESCRIPTION OF THE INVENTION

It is an object of the present invention to provide a dual latching arrangement for a pair of first and second laterally spaced slide track assemblies supporting a vehicle seat wherein a primary latching mechanism positively locks its associated first track assembly, on release of an operating bar, while a secondary latching mechanism is adapted to operate independently by having its locking detent in floating contact with its associated second track assembly for subsequent automatic locking thereof in a tolerance compensating manner.

It is another object of the present invention to provide a dual latching arrangement as set forth above wherein a keeper bracket, mounted on an associated movable track member, is formed with alignment openings operative to positively retain its associated locking detent in transverse alignment with its corresponding set of longitudinally aligned detent lock openings of a corresponding fixed track member.

In accordance with the present invention, a vehicle seat comprises a pair of first and second laterally spaced slide track assemblies supporting a vehicle seat for horizontal fore and aft movement to a plurality of adjusted positions. Each track assembly includes a lower track member fixed to the vehicle having a series of adjusting lock openings and an upper sliding track member. The dual latching arrangement consists of a central U-shaped lift bar having the free end of each of its longitudinally extending legs rotationally supported adjacent the aft end portion of its associated track assembly for rotation about a common transverse pivot axis.

A primary latching mechanism has a detent bracket arranged with its aft end supported on the first track assembly upper track member for rotation about the pivot axis. A secondary latching mechanism has a detent bracket aft end supported on the second track assembly upper track member for rotation about the pivot axis adjacent the second track assembly. The primary latching mechanism detent bracket is operative to pivot in unison with its associated lift bar leg while the secondary latching mechanism detent bracket is arranged to pivot in unison with its associated leg upon the lift bar being raised to its unlatched upper position. Springs are provided for downwardly biasing the primary and secondary latching mechanism detent brackets together with mirror image downwardly projecting locking detents to engage one of a series of lock openings formed in their associated lower track member. The arrangement allows the primary locking detent to positively engage an aligned lock opening while the secondary detent is biased into floating contact on its associated lower track member. Thus, the secondary detent automatically engages a corresponding lock opening on its associated lower track member upon subsequent tolerance compensating movement of the upper track.

BRIEF DESCRIPTION OF THE DRAWINGS

These and other features and advantages of the invention will appear from the following written description and in which:

FIG. 1 is a perspective view of a sliding seat mechanism used in a vehicle seat, incorporating the dual latching arrangement of the present invention;

FIG. 2 is a fragmentary enlarged side elevational view taken along the line 2—2 of FIG. 1 showing the inboard seat track latching mechanism in its locked mode;

FIG. 3 is a view similar to FIG. 2 showing the inboard seat track latching mechanism in its unlocked mode;

FIG. 3A is fragmentary view similar to FIG. 3 showing a portion of the outboard mechanism in its unlocked floating mode;

FIG. 4 is a fragmentary vertical cross sectional view of the seat inboard and outboard tracks with the dual latching arrangement shown both the inboard and outboard tracks in their locked mode;

FIG. 5 is a view similar to FIG. 4 showing both the inboard and outboard tracks in their unlocked mode; and FIG. 6 is a view similar to FIG. 4 showing the inboard track in its locked mode and the outboard track in its unlocked mode.

DESCRIPTION OF THE PREFERRED EMBODIMENT

Referring now to FIG. 1, there is shown a vehicle seat support structure, generally designated 10, shown in phantom and is adapted to be positioned in the in the front or forward position of the passenger compartment of a motor vehicle. The seat support structure is on the driver's or left side in the form shown such that the near side is the outboard side of the vehicle. The vehicle seat support structure is adapted to support a seat cushion and seat back (not shown) of conventional structure. The seat support structure 10 is supported on the vehicle floor by a position control mechanism generally indicated at 12.

The position control mechanism 12 includes an inboard track assembly 14 and an outboard track assembly 16. The inboard track assembly 14 includes a first lower generally channel shaped track member 18 having a base 20 thereof mounted to an inboard lower track member support plate 22 adapted to mounted to the floor pan of the vehicle. A second upper C-shaped track member 24 envelopes the lower track member 18 and is slidably supported with respect thereto by suitable means such as a pair of cage and bearing assemblies (not shown). Reference may be had to the U.S. Pat. No. 4,639,038 for details of one form of cage and bearing assembly suitable for use with the track assemblies 14 and 16, the disclosure of which is incorporated by reference herein.

The outboard track assembly 16 includes a first lower generally channel shaped track member 26 having a base 28 thereof mounted to an outboard track support plate 30 adapted to be mounted to the floor pan of the vehicle. An upper C-shaped track member 32 envelopes the lower track member 26 and is slidably supported with respect thereto in a manner identical to the inboard track assembly.

As seen in FIGS. 1 and 4 a primary inboard latch mechanism 40 for releasably locking the inboard upper track member 24 to the lower track member support plate 22 comprises a generally Z-shaped keeper member 42 and a generally L-shaped detent bracket 44. FIG. 4 shows the inboard Z-shaped keeper member 42 having an upper right angle flange 46 welded to bight portion 48 of the upper C-shaped track member 24 for sliding movement therewith. The keeper member 42 has an intermediate flange 50 formed with a lower right angle flange 52. It will be noted in FIG. 1 that the inboard lower track member support plate edge portion 54 is formed with a series of longitudinally aligned detent lock openings 56. FIG. 3 shows the lower keeper flange 52 is formed with a pair of lock openings 58 adapted for lateral and vertical alignment with a corresponding pair of subjacent lock openings 56.

As seen in FIG. 1, a central generally U-shaped lift bar 60 is located intermediate the inboard 14 and outboard 16 track assemblies. The lift bar 60 comprises a pair of parallel longitudinally extending inboard 62 and outboard 64 legs interconnected at their forward ends by an integral transverse handle 66. FIGS. 1 and 4 show the inboard leg 62 having its aft free end rotatably connected to the inboard upper sliding track member 24 by inboard pivot pin 68. The inboard pivot pin 68 has its one inboard end anchored to inboard gusset 70 (FIG. 1) fixed to the upper inboard track member 24 such that the pivot pin 68 slides with the upper track member 24.

FIG. 1 shows the inboard L-shaped detent bracket 44 having its long arm 72 extending longitudinally and intermediate the inboard upper track member 24 and the inboard leg 62 of the lift bar. The aft end of the inboard detent bracket long arm 72 has a bore through which the inboard pivot pin 68 extends allowing the inboard detent bracket 44 to pivot about the transverse axis of the pin 68. A short arm 74 of the inboard detent bracket 44 extends transversely outboard from its long arm 72 and has its free end bifurcated into a pair of upper and lower prongs 76 and 78, respectively. As seen in FIG. 4 the prongs 76 and 78 are vertically spaced to capture the lift bar inboard leg 62 therebetween.

With reference to FIGS. 2, 3, and 4 it will be seen that the inboard detent bracket 44 long arm 72 is formed with a pair of vertically oriented downwardly projecting detents 80 and 82. With the latching bar 60 in its FIG. 2 biased locking mode each of the detents 80 and 82 are received in a pair of adjacent lock openings 58 thereby preventing fore and aft movement of the vehicle seat 10. It will be noted that spring biasing means in the form of a torsion wire spring 84 has a central portion coiled around the pivot pin 68. The torsion spring 84 has two ends extended to form a pair of fingers wherein its one finger 86 engages the upper edge of detent bracket short arm 74 and its other finger 88 engaging an upper edge of a tab 90 secured, as by welding, to the upper inboard track member 24. The torsion spring operates to position the detent bracket 44 and the lift bar arm 62 in a downward position so as to bias the pair of inboard detents 80 and 82 into locked engagement with a pair of aligned adjacent lock openings 58 as seen in FIG. 2.

It will be seen in FIG. 1 that as the seat position control mechanism provides substantially mirror image inboard 14 and outboard 16 track assemblies having like or similar primary and secondary latch mechanisms components which will be designated by the same numerals with the outboard secondary latch mechanism 40' components being primed. Thus, the secondary outboard latch mechanism 40' for releasably locking the outboard upper track member 32 to the outboard lower track member support plate 30 comprises a generally Z-shaped outboard keeper 42' and a generally L-shaped outboard detent bracket 44'. FIG. 4 shows the outboard Z-shaped keeper 42' having an upper right angle flange 46' welded to bight portion 48' of the upper C-shaped outboard track member 32 for sliding movement therewith. The keeper 42' has an intermediate vertical flange 50' formed with a lower right angle upper foot flange 52'. FIG. 1 shows the outboard lower track member support plate edge portion 31 formed with a series of longitudinally aligned detent lock openings 56'. FIG. 3A further shows the lower keeper flange 52' formed with a pair of lock openings 58' adapted for vertical alignment with subjacent lock openings 56'.

Accordingly the outboard leg 64 is shown having its aft free end connected to the outboard upper sliding track member 32 by outboard pivot pin 68' shown in FIG. 4 coaxially aligned on common pivot axis "X" together with the inboard pivot 68. The outboard pivot pin 68' has its one outboard end anchored to outboard gusset 70' fixed to the upper outboard track member 32 such that the outboard pivot pin slides therewith.

The outboard L-shaped detent bracket 44' has its long arm 72' extending longitudinally and intermediate the outboard the upper track member 32 and the outboard leg 64. The aft end of the outboard detent bracket long arm 72' has a bore through which the outboard pivot pin 68' extends allowing the outboard detent bracket to pivot about the transverse pivot axis "X" of the outboard pivot pin 68'. A short arm 74' of the outboard detent bracket 44' extends transversely inboard from its long arm 72' and has its free end provided with a single upper prong 76' adapted to contact the upper surface of the outboard lift bar leg 64.

As viewed in to FIGS. 1, 3A and 6 the secondary outboard latch mechanism 40' outboard detent bracket 44' long arm 72' is also formed with a pair of vertically oriented downwardly projecting detents 80' and 82'. With the latching bar 60 in its FIG. 6 biased locking mode the pair of outboard detents 80' and 82' are shown in a slightly misaligned condition such that the lower ends of the one detent 82' is in spring biased or floating contact with the upper surface of the inwardly directed edge portion 56 of the outboard track support plate 30. The keeper member 42' has an intermediate flange 50' formed with a lower right angle flange 52' having a parallel return flange 54' such that the lower flange 52' and the return flange 54' straddle inboard edge portion 31 of the lower outboard track support plate 30. The edge portion 31 is formed with a series of longitudinally aligned detent lock openings 58'.

Outboard leg 64 of the lift bar 60 has its aft end rotatably connected to the outboard upper sliding track member 32 by outboard pivot pin 68' and had its one outboard end anchored to outboard gusset 70'. FIG. 1 shows the outboard detent bracket 44' having its long arm 72' extending longitudinally and intermediate the outboard upper track member 32 and the outboard leg 64 of the lift bar 60. The aft end of the outboard detent bracket long arm 72 had a bore through which the outboard pin 68' extends allowing the outboard detent bracket 44' to pivot about the transverse axis X of the pivot pins 68 and 68'. Outboard detent bracket short arm 74' extends transversely inboard from its long arm 72' and has its free end formed with a single upper prong 76'. As seen in FIG. 4 the single upper prong 76' contacts the apex of the lift bar outboard leg 64 such that the outboard detent bracket 44' travels only upwardly in unison with the leg 64 while rotating downwardly independently of the leg 64.

It will be noted that the outboard spring biasing means for the outboard latching mechanism 40' is a torsion wire spring 84' having a central portion coiled around the outboard pivot pin 68'. The outboard torsion spring 84' has its one finger 86' engaging the upper edge of detent short arm 74 and its other finger 88' engaging the upper edge of outboard tab 90' secured, as by welding, to the upper outboard track member 32. The outboard torsion spring 84' has two ends extended to form a pair of fingers wherein one finger 86' engages the upper edge of outboard detent bracket short arm 74' and its other finger 88' engages the upper edge of outboard tab 90' suitably secured, as by welding, to the upper outboard track member 32. The outboard torsion spring 84' operates to position the outboard detent bracket 44' only to a predetermined downward position biasing the pair of outboard detents 80' and 82' into locked engagement with a pair of outboard lock openings 56' as seen in FIG. 4.

With reference to FIG. 3, it will be seen that with the lock bar 60 elevated to its predetermined unlatched stop position at least one of its locking detents, i.e., trailing or rearmost detent 82, remains captured or engaged in its associated keeper lower flange lock opening 58. Suitable stop means, such as the seat support structure 10 transverse front support bar 92 is vertically positioned to limit the upward rotational movement of the lift bar inboard leg 62 upon an operator manually lifting the handle portion 66 of the lift bar.

It will be seen in FIGS. 3A and 6 that upon lock bar being released from its upper unlatched mode the inboard detents 80 and 82 are received in locked engagement with a pair of inboard lock openings. The outboard detents 80' and 82', however, may be misaligned with their corresponding openings 58'. In this case, as the downward movement of the outboard leg 64 is independent of the outboard detent bracket 44', the outboard detents 80' and 82' will be biased downwardly until lead detent 80' contacts the upper surface of the outboard track edge portion 31. Thus, the seat 10 will be securely locked in its adjusted position by the engaged inboard detents 80 and 82. Upon subsequent tolerance compensating longitudinal sliding movement of the outboard upper track member 32 the outboard detents 80' and 82' will be automatically received in their corresponding openings 58' because of the constant urging of the outboard biasing torsion spring 84' on the outboard detent bracket 44'.

It will be appreciated that the use of the terms inboard and outboard in the specification and claims is merely for the purposes of description and such terms could be reversed, for example, without departing from the scope of the present invention.

Although a preferred embodiment of the invention has been illustrated and described in detail, it will be understood that various changes and modifications ma be made in the disclosed embodiment without departing from the scope and spirit of the invention as defined in the appended claims.

What is claimed is:

1. A seat support structure for a vehicle comprising a pair of laterally spaced apart inboard and outboard track assemblies for mounting the seat structure on the vehicle providing horizontal fore and aft movement to a plurality of adjusted positions, said inboard and outboard track assemblies comprising a pair of inboard and outboard stationary track means fixed to the vehicle each having a respective series of longitudinally spaced lock openings therein, a pair of inboard and outboard movable track means each having a forward end portion and an aft end portion and slidably mounted on an associated one of said inboard and outboard stationary track means, a seat adjustment dual locking arrangement for said seat support structure inboard and outboard track assemblies comprising:

a generally U-shaped latch release lift bar symmetrically disposed intermediate said inboard and outboard track assemblies about a longitudinal axis of symmetry of said seat support structure, said lift bar comprising a pair of longitudinally extending inboard and outboard legs interconnected at their forward ends by a handle portion, said inboard leg having its aft free end rotatably connected by inboard pivot pin means to said inboard sliding track means aft end portion and said outboard leg having its aft free end rotatably connected by outboard pivot pin means to said outboard sliding track means aft end portion, said inboard and outboard pivot pin means aligned on a common transverse pivot axis;

a primary latch mechanism comprising a longitudinally extending detent bracket rotatably connected to said inboard pivot pin means, and inboard resilient means biasing said primary latch mechanism detent bracket in a fir rotational direction to a predetermined latched position;

said primary detent bracket having at least one inboard locking detent extending vertically therefrom such that with said inboard detent bracket in its predetermined biased position said inboard locking detent is adapted to engage one of said inboard lock openings;

a secondary latch mechanism comprising a longitudinally extending detent bracket rotatably connected to said outboard pivot pin means, and outboard resilient means biasing said secondary latch mechanism detent bracket in said first rotational direction to a predetermined latched position;

said secondary latch mechanism having at least one outboard locking detent extending vertically therefrom such that with said outboard detent bracket in its predetermined biased position said outboard locking detent adapted to engage one of said outboard lock openings;

and means connecting said inboard and outboard detent brackets with said lift bar inboard and outboard legs, respectively, such that upon said lift bar handle portion being rotated a predetermined distance in a second opposite rotational direction in opposition to said inboard and outboard resilient means said inboard and outboard bracket detents are rotated in unison therewith to their predetermined unlatched positions; and whereby upon said lift bar handle portion being released from its unlatched position said inboard resilient means causing said lift bar and said inboard detent bracket to be rotated about said pivot axis in said first rotational direction wherein said inboard locking detent is engaged in one of said inboard lock openings locking said seat support structure in a longitudinally adjusted position, and whereby said outboard resilient means causing said outboard detent bracket to be rotated about said pivot axis in said first rotational direction wherein said outboard locking detent is biased into floating contact with said outboard stationary track means in the event that said outboard locking detent is misaligned with a corresponding outboard lock opening, such that said outboard biasing means operative to automatically engage said outboard locking detent in said corresponding lock opening upon subsequent tolerance compensating travel of said outboard movable track means.

2. A seat support structure for a vehicle comprising a pair of laterally spaced apart inboard and outboard track assemblies for mounting the seat structure on the vehicle providing horizontal fore and aft movement to a plurality of adjusted positions, said inboard and outboard track assemblies comprising a pair of inboard and outboard stationary lower track means fixed to the vehicle each having a respective series of longitudinally spaced lock openings therein, a pair of inboard and outboard movable upper track means each having a forward end portion and an aft end portion and slidably mounted on an associated one of said inboard and outboard stationary lower track means, a seat adjustment dual locking arrangement for said seat support structure inboard and outboard track assemblies comprising:

a generally U-shaped latch release lift bar symmetrically disposed intermediate said inboard and outboard track assemblies about a longitudinal axis of symmetry of said seat support structure, said lift bar comprising a pair of longitudinally extending inboard and outboard legs interconnected at their forward ends by transverse handle portion, said inboard leg having its aft free end rotatably connected by inboard pivot pin means to said inboard sliding upper track means aft end portion and said outboard leg having its aft free end rotatably connected by outboard pivot pin means to said outboard sliding upper track means aft end portion, said inboard and outboard pivot pin means aligned on a common transverse pivot axis;

a primary latch mechanism comprising a longitudinally extending detent bracket rotatably connected to said inboard pivot pin means, and inboard resilient means biasing said primary latch mechanism detent bracket in a downward rotational direction to a predetermined latched position;

said primary detent bracket having at least o inboard locking detent extending vertically downwardly therefrom such that with said inboard detent bracket in its predetermined downwardly biased position said inboard locking detent is adapted to engage one of said inboard lock openings;

a secondary latch mechanism comprising a longitudinally extending detent bracket rotatably connected to said outboard pivot pin means, and outboard resilient means biasing said secondary latch mechanism detent bracket in a downward rotational direction to a predetermined latched position;

said secondary latch mechanism having at least one outboard locking detent extending vertically downwardly therefrom such that with said outboard detent bracket in its predetermined downwardly biased position said outboard locking detent adapted to engage one of said outboard lock openings;

and means connecting said inboard and outboard detent brackets with said lift bar inboard and outboard legs, respectively, such that upon said lift bar handle portion being rotated a predetermined distance in an upward rotational direction in opposition to said inboard and outboard resilient means said inboard and outboard bracket detents are rotated upwardly in unison therewith to their predetermined upper unlatched positions; and whereby upon said lift bar handle portion being released from its unlatched position said inboard resilient means causing said lift bar and said inboard detent bracket to be rotated about said pivot axis in said downward rotational direction wherein said inboard locking detent is engaged in one of said inboard lock openings locking said seat support structure in a longitudinally adjusted position, and whereby said outboard resilient means causing said outboard detent bracket to be rotated about said pivot axis in a downward rotational direction wherein said outboard locking detent is biased into floating contact with said outboard stationary track means in the event that said outboard locking detent is misaligned with a corresponding outboard lock opening, such that said outboard biasing means operative to automatically engage said outboard locking detent in said corresponding lock opening upon subsequent tolerance compensating travel of said outboard movable track means.

* * * * *